Nov. 11, 1969   P. H. BROWN ET AL   3,477,395
PALLET LEG STRUCTURE
Filed Feb. 28, 1968

INVENTORS.
PHILIP H. BROWN
and LLOYD W. ELLSON
BY
Woodard, Weikart, Emhardt & Naughton
Attorneys

# United States Patent Office 3,477,395
Patented Nov. 11, 1969

3,477,395
PALLET LEG STRUCTURE
Philip H. Brown, Zionsville, and Lloyd W. Ellson, Indianapolis, Ind., assignors to Inland Container Corporation, Indianapolis, Ind., a corporation of Indiana
Filed Feb. 28, 1968, Ser. No. 709,003
Int. Cl. B65d 19/00, 19/40
U.S. Cl. 108—51                            4 Claims

ABSTRACT OF THE DISCLOSURE

The inventive concept is embodied in a pallet leg or runner which is formed by multiple folding on itself of a slit scored sheet of corrugated board, with one liner component of the corrugated extended to wrap around the folded, corrugated board, and adhered to it with a wet adhesive.

Background of the invention

*Field of the invention.*—The invention relates to pallets in which articles such as boxed material is stored or transported. Such pallets have wide use in the warehousing and mass handling of various products. The use of disposable pallets formed of corrugated board or similar material has advantages in that the bookkeeping and accountability procedures for returnable, permanent-type pallets can involve substantial time and expense.

*Description of the prior art.*—Pallet legs made of corrugated board, with the corrugations extending parallel to the axis of the leg when mounted on a pallet, are not unknown in the prior art. U.S. Patents 2,738,153 and 2,493,562 disclose pallet legs of this type.

Summary of the invention

The pallet leg of the present invention can be fabricated, using standard box-making equipment, at low cost and requiring a minimum amount of material. The extended liner component, utilizing a wet adhesive to hold the folded corrugated board, causes a shrinking action in the wetted portion of the liner as the adhesive dries which draws the plies or layers of corrugated board tightly together providing a strong structure without the necessity of gluing each ply to its adjacent plies. While the disclosure illustrates the inventive concept embodied in conventional corrugated board, it will be understood that other sheet material composed of a central filler component between facing components (for example, a sheet composed of a central, polystyrene filler between paper facings) might also be utilized.

Description of the preferred embodiment

Figure 1:
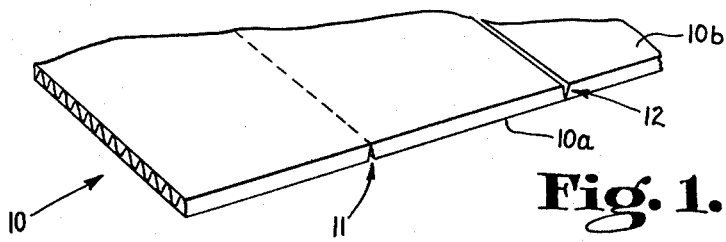
FIG. 1 is a perspective, fragmentary view of corrugated board which has been slit scored to permit folding into the leg structure of the present invention.
Figure 5:
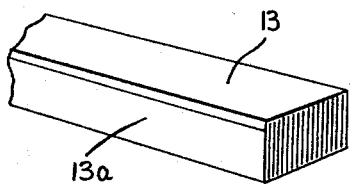
FIG. 5 is a perspective view of a portion of the completed leg structure.

Referring initially to FIGS. 1 through 5, the leg structure of the present invention is formed from sheets of double faced corrugated board which have been slit scored to permit folding of the sheet upon itself producing the elongated bar form of the leg structure shown in FIG. 5. In FIG. 1 a sheet of corrugated board is fragmentarily illustrated at 10 with spaced slit scores 11 and 12 extending along the sheet transverse to the direction of the corrugations. The slit scoring is performed with conventional box-making machinery and provides a slit, as indicated at 11, in one liner component 10a of the corrugated board and alternately, provides a slit in the opposite liner 10b of the corrugated board.

Figure 2:
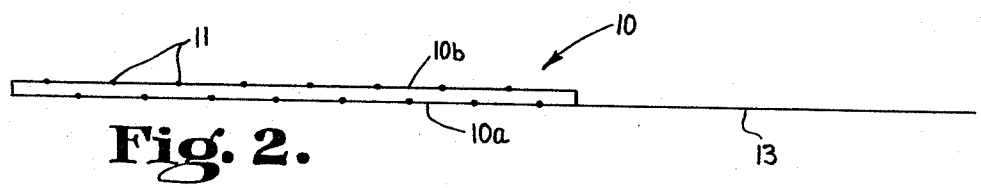
FIG. 2 is a schematic edge view of the sheet of corrugated board shown in FIG. 1 but illustrating the extended liner component.

As may best be seen in FIG. 2 these alternate slit scores extend over the face of the sheet and one liner component 10a is extended beyond the opposite liner 10b and the corrugations interposed between, this extending portion of the liner being indicated at 13 in FIG. 2.

Figure 3:
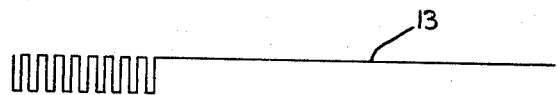
FIG. 3 is a schematic view of the corrugated sheet shown in folded condition but before fastening.
Figure 4:
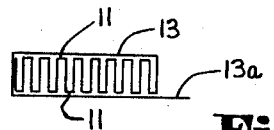
FIG. 4 is a schematic end view, similar to FIG. 3, but showing the leg structure in completed form with the extended liner wrapped around the folded portion and adhered.

The slit scored sheet may then be folded so that the portions between the slit scores alternately face each other as shown in FIG. 3. Adhesive is applied to the extended liner portion 13 which is then wrapped over the folded portions as shown in FIG. 4. The marginal portion 13a is then folded upwardly so as to overlap and adhere to the adjacent extending margin portion, forming the completed bar shown in FIG. 5.

The faces of the folded portions need not be glued, as is conventional in such structures, however, a tight, strong assembly is achieved by the use of a wet adhesive in fastening the extended liner 13. As the adhesive dries, this tends to shrink the liner portion and consequentially compresses and holds the folded portions in tightly facing relation while the liner also adheres to the top and bottom of the folded portions.

Figure 6:
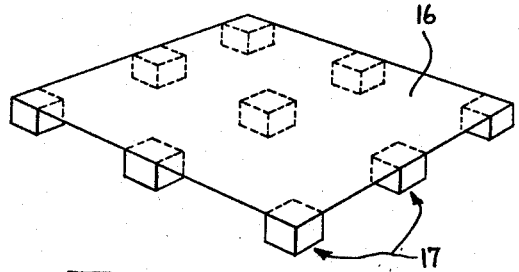
FIG. 6 is a perspective view of a typical pallet utilizing leg elements cut from the length of leg assembly shown in FIG. 5.
Figure 7:
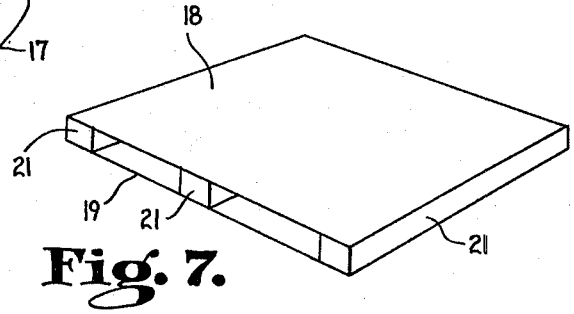
FIG. 7 is a perspective view of a conventional double faced pallet using the leg structure of FIG. 5 lengthwise between the two faces of the pallet.

Desired lengths of the bar shown in FIG. 5 may be cut and glued on a pallet face component to form conventional pallets as illustrated in FIG. 6. The conventional, single faced pallet there shown is composed of the face sheet 16 and a plurality of legs 17 cut from a bar formed as illustrated in FIGS. 1 through 5. FIG. 7 illustrates a conventional double faced pallet having face components 18 and 19 with length of the leg structure of FIGS. 1 through 5 extending between and fastened to the face elements, the leg structure being illustrated at 21. When so arranged the pallet may be entered from either end by lift truck forks.

The leg structure of the present invention is extremely strong and utilizes a minimum amount of material. The leg structure is assembled and shipped by the container manufacturer and no assembly is required by the user, that is, no assembly of the legs are required at the point of loading of the containers to be accommodated on the pallet. The pallet legs may be treated for moisture resistance and leg structure of various dimension can be fabricated by varying the spacing of the slit scores in the sheets from which the legs are fabricated.

While the invention has been disclosed and described in some detail in the drawings and foregoing description, they are to be considered as illustrative and not restrictive in character, as other modifications may readily suggest themselves to persons skilled in this art.

We claim:
1. A disposable pallet leg element of the type made of a sheet of material formed by a central filler component between two flexible facings, the sheet being folded upon itself when installed in a pallet, wherein the improvement comprises the extension of the outer facing of the sheet beyond the terminus of the filler component, the extending portion of the facing being wrapped around the folded sheet and adhered with an adhesive which produces shrinkage in the facing as it dries, the shrinking of the facing upon drying serving to place the filler component under compression.

2. A disposable pallet leg as claimed in claim 1 in which the fold lines along which the sheet of material is folded are determined by spaced parallel slits alternately made in the facings overlying the filler component.

3. A disposable pallet leg element of the type made of corrugated board folded upon itself and oriented so that the corrugations extend parallel to the longitudinal axis of the leg when installed in a pallet, wherein the improvement comprises the extension of the outer liner of the corrugated board beyond the flutes, the extending portion of the liner being wrapped around the folded corrugated board and adhered with a wet adhesive, the shrinking of the liner upon drying serving to tighten the corrugated folds against each other.

4. A disposable pallet leg as claimed in claim 3 in which the fold lines along which the corrugated board is folded are determined by spaced parallel slits alternately made in the liners overlying the corrugation flutes.

References Cited

UNITED STATES PATENTS

| | | | |
|---|---|---|---|
| 2,446,914 | 8/1948 | Fallert, et al. | 108—57 |
| 2,493,562 | 1/1950 | Yarman | 108—58 |
| 2,494,730 | 1/1950 | Thursby | 108—55 |
| 2,503,240 | 4/1950 | Cahners | 108—56 |
| 2,738,153 | 3/1956 | Frase | 108—58 |
| 2,970,797 | 2/1961 | Desbois | 108—56 |
| 3,026,015 | 3/1962 | Severn | 108—55 XR |
| 3,192,099 | 6/1965 | Beckman, et al. | 108—52 XR |
| 3,380,403 | 4/1968 | Sullivan | 108—51 |

BOBBY R. GAY, Primary Examiner

G. O. FINCH, Assistant Examiner

U.S. Cl. X.R.

108—58